United States Patent [19]
Tyler

[11] Patent Number: 5,386,364
[45] Date of Patent: Jan. 31, 1995

[54] COMMUNICATION OF CONTROL SIGNALS TO A VEHICLE USING ITS BUMPER SWITCH

[75] Inventor: Tommy N. Tyler, Broomfield, Colo.

[73] Assignee: TransLogic Corporation, Denver, Colo.

[21] Appl. No.: 71,185

[22] Filed: Jun. 2, 1993

[51] Int. Cl.⁶ .............................................. G06F 15/50
[52] U.S. Cl. .................. 364/424.02; 364/424.01; 318/587
[58] Field of Search ............ 364/424.02, 424.05, 364/461, 424.01; 180/167, 168, 169; 318/587; 307/10.1, 9.1

[56] References Cited
U.S. PATENT DOCUMENTS

| | | | |
|---|---|---|---|
| 3,823,673 | 7/1974 | Wesener | 104/148 |
| 4,027,596 | 6/1977 | Nardozzi, Jr. | 104/138 |
| 4,630,216 | 12/1986 | Tyler et al. | 364/478 |
| 4,909,153 | 3/1990 | Lacroix et al. | 104/166 |
| 5,036,935 | 8/1991 | Kohara | 180/168 |
| 5,163,001 | 11/1992 | Luke, Jr. | 364/424.02 |
| 5,170,352 | 12/1992 | McTamaney et al. | 364/424.02 |
| 5,281,901 | 1/1994 | Yardley et al. | 318/587 |

*Primary Examiner*—Michael Zanelli
*Attorney, Agent, or Firm*—Sheridan Ross & McIntosh

[57] ABSTRACT

A method for using an obstruction detection device, residing on an automated conveyance vehicle, as an input device for supplying a plurality of predetermined control codes to a controller for the vehicle. Each code is related to predetermined vehicle behavior regulated by the controller. Such codes are used for commencing forward movement, commencing backward movement and stopping the vehicle. Furthermore, included within the collection is a subset of codes to be input exclusively by maintenance personnel. That is, the codes within the subset are highly unlikely to occur in the normal course of vehicle operation.

30 Claims, 5 Drawing Sheets

COMMUNICATION OF CONTROL SIGNALS TO A VEHICLE USING ITS BUMPER SWITCH

FIELD OF THE INVENTION

The present invention relates to conveying commands to self-powered, unmanned material conveying vehicles of the type that are used to automatically transport materials over a predetermined path from one point to another within a commercial office building, factory, hospital, or any other type of facility. In particular, the invention relates to automated vehicles of the type described that include bumper switches, proximity detectors, or other devices for controlling a vehicle's movement, whereby commands can be easily input by maintenance personnel.

BACKGROUND OF THE INVENTION

In relatively large office buildings, including hospitals, it is beneficial to be able to transport various materials or articles from one location to another with maximum efficiency. To accomplish such an objective, conveying systems have been developed which include tracks and vehicles which move along the tracks. The vehicles are designed for receiving and holding small articles which are transportable from one station located near one section of the track to another station located near another section of the track. Such vehicles are often referred to commercially as electric track vehicles (ETV), automated guided vehicles (AGV), or electrified monorail systems (EMS). The vehicles are typically propelled by one or more AC or DC electric motors, and derive their energy from on-board batteries or by electrified collector rails that run continuously along the track followed by the vehicles.

From the standpoint of control strategies, such automated conveyance vehicles can be entirely self-sufficient (i.e., determining autonomously when to start, stop, slow down, turn, back up, etc., based on external stimuli, time, distance or other factors) or, alternatively, such a vehicle may be entirely under the direction of a controller that is not part of the vehicle itself. A common arrangement is a combination of the above two strategies where each vehicle has a predetermined control capability but the vehicle is also in continuous or periodic communication with at least one external controller that provides traffic management, job assignments and other high level functions.

A common difficulty with such automatic conveying vehicles occurs when one such vehicle experiences a malfunction during transit, thereby causing the vehicle to stop for an extended period of time. In such cases, maintenance personnel often encounter difficulties in correcting the malfunction due to a "pile-up" of other vehicles behind the vehicle experiencing the malfunction. That is, one vehicle travelling along a route used in common by a plurality of conveyance vehicles stops and additional vehicles trying to traverse the same route queue up behind the first vehicle, each stopping by means of, for example, a bumper switch or other form of obstruction detection. In such cases, to gain access to or correct the malfunction at the front of the vehicle pile-up, substantially all the vehicles in the pile-up must be moved back a short distance, particularly if the vehicles are in direct contact with one another. One well known way of accomplishing this has been applied to electric track vehicles in the form of a three position toggle switch mounted somewhere on each vehicle such that each such switch is accessible by trained maintenance personnel. Commonly, the switch has three positions, two of which are maintained (i.e., the switch will remain in the position when switched) and the third being momentary (i.e., the switch will not remain in the position without the continual application of force). In this switch embodiment, one of the maintained positions is the position which enables the vehicle to operate in its usual fashion. A second maintained position for the switch allows the vehicle drive motor to be manually shut off, and thereby overriding all other control means such that the vehicle stops indefinitely. This second position is useful if a maintenance person wants to disable a vehicle while he performs work in its vicinity, or if the vehicle controls have failed in such a way as to leave the motor running even though the vehicle cannot move. The momentary third switch position reverses power to the vehicle motor so that it runs in reverse. This position can be used to back a vehicle away from a pile-up. The switch is typically spring loaded away from this position to prevent the possibility of inadvertently leaving the switch in the reverse position, a position which can potentially cause head-on collisions between vehicles.

There are several shortcomings to using a simple toggle switch as above for manually overriding control of such conveyance vehicles. First, the switch is often mounted toward one side of the vehicle and may be difficult to reach if that side of the vehicle is facing, for example, a nearby wall. Second, the momentary action of the switch for back-up requires that manual contact with the switch be maintained while the vehicle is backing away from, for example, a pile-up. Often, a maintenance person is perched atop a high ladder, clinging hazardously to the walls of a vertical shaftway in a multi-story building, or in some other awkward location where maintaining contact with a moving vehicle is dangerous. The fact that the switch is usually mounted in a relatively inconspicuous location so that it is out of sight and temptation of users of the conveyance system serves to exacerbate the problem. Third, when the vehicle does move in reverse, it typically does so at full speed and full power. This abrupt movement further compounds the difficulties of maintaining manual control and adds to the hazard described above.

It would be advantageous to provide a simple means for taking control of such automated conveyance vehicles on a temporary manual basis without the foregoing disadvantages. That is, it would be advantageous for a maintenance person to be able to easily control each such vehicle by directing the vehicle to stop (temporarily or indefinitely), move backwards or operate normally using, substantially, existing vehicle components such as a bumper switch.

OBJECTIVES OF THE INVENTION

One objective of the invention is to provide a simple control mechanism for an automated conveyance vehicle whereby control is input via an obstruction detection device such as a bumper switch.

A second objective of the invention is to implement the above control mechanism upon substantially the same conveyance vehicles as are currently in use. That is, the invention can be embodied with substantially only software component enhancements to conveyance vehicles responsive to a processor receiving obstruction detection signals.

SUMMARY OF THE INVENTION

The present invention is a method and apparatus for controlling the movement of an automated conveyance vehicle using input obtained from an obstruction detection mechanism residing on the vehicle. More specifically, the invention provides a mechanism whereby vehicles having both an obstruction detection device(s) and an obstruction detection controlling capability can be enhanced such that a signal or code input to the controlling capability from the obstruction detection device(s) is interpreted for stopping, backing up or commencing normal conveyance operation of the vehicle.

The present invention is embodied in an electric track conveyance vehicle having bumper switches as the obstruction detection devices and having a controller for controlling substantially all movement of the vehicle. Electrical signals or codes are input to the controller by the bumper switches and subsequently the controller outputs electrical control signals to the vehicle's motor designating the speed and direction of the vehicle. A bumper switch is attached to the front and the rear of the vehicle. Each bumper switch has at least two states: a non-contact or release state whereby no portion of the bumper switch registers a force or pressure upon the bumper switch greater than some predetermined constant, and a contact or depressed state wherein some portion of the bumper switch has a force or pressure applied to it greater than the predetermined constant. Further, each bumper switch can register a pressure lasting a variable amount of time. That is, the bumper switches can supply input to the controller for determining whether the vehicle is momentarily bumped or remains forcefully in contact with another object (e.g., another vehicle). Thus, since the controller can use such input to determine the length of time the vehicle has one (or both) of its bumper switches released and/or depressed, each bumper switch can be used for transmitting vehicle control instructions in a Morse Code-like manner. That is, a predetermined plurality of codes can be specified where each code is generated by a unique predetermined sequence of timed bumper switch depressions and releases. Further, if certain of these codes are generated by sequences of depressions and releases that are highly unlikely to occur in normal operation, then interpreting each such code as a vehicle control instruction allows the vehicle to be simply, easily and unambiguously controlled by personnel with knowledge of the codes.

In the present embodiment, there are at least three such codes recognized by the vehicle(s). These codes are intended for use by maintenance personnel and are unlikely to occur in the normal course of automatic vehicle operation. Further, there are at least two additional codes of bumper switch depressions and releases which are recognized. These latter two codes both occur in normal operation and can also be used by maintenance personnel for vehicle control. Thus, in all, there are at least five distinct bumper switch codes simultaneously and unambiguously embodied in the invention, each of the five codes resulting in distinct vehicle behavior. Each of these five codes will now be discussed.

A first bumper switch code is generated from a single contact or depression of the front bumper when the vehicle is moving forward. The code is related to a temporary stop instruction for the vehicle and is input both during normal vehicle operation and by maintenance personnel. The vehicle remains stopped for a predetermined time interval (e.g., two seconds) after the release of the bumper switch and subsequently attempts to move forward. This code can occur, for example, if a first vehicle overtakes a second vehicle on the same track of the conveyance system. In this case, the overtaking first vehicle bumps the rear of the second vehicle and subsequently stops for the predetermined time, thus allowing the second vehicle to continue and distance itself from the first vehicle. Alternatively, a maintenance person can easily use this code to temporarily stop a vehicle by manually depressing the front bumper as the vehicle approaches him/her.

When a vehicle is stopped, a second bumper switch code is generated from a continuous front bumper depression of at least a first predetermined time interval followed by a release of the front bumper switch. Subsequently, following a second predetermined time interval, the vehicle commences to move forwardly. This second code is also useful in controlling the vehicle both as part of the normal course of operation and during maintenance procedures. In the normal course of operation, for example, a first such vehicle may encounter or become part of a vehicle pile-up. That is, the first vehicle will stop when it contacts an immediately preceding stopped second vehicle. Further, since the first vehicle's front bumper remains in contact with the second vehicle, this bumper switch remains depressed for the first predetermined time interval (e.g., 2 seconds). Subsequently, if the second vehicle commences to move forwardly, the first vehicle remains stopped for the second predetermined time interval and then also commences to move forwardly.

In a maintenance context, this second code is useful when a maintenance person encounters a vehicle indefinitely stopped, for example, via an indefinite stop bumper switch input code (discussed below) or an out of range condition such as an electrical power, motor revolutions or a motor temperature out of range condition. The maintenance person can input this second code thereby causing the vehicle to activate a procedure to attempt forward movement in a normal operational manner.

A third bumper switch code is generated from three depression and release pairs on the front bumper within a short enough time interval to be unambiguous from any other code (e.g., 2 seconds). This code is interpreted as an indefinite stop. That is, the first bumper depression stops the vehicle if it is moving forward. The subsequent depressions and releases cause the vehicle to remain stopped indefinitely until another vehicle movement instruction is received. Note that this code is highly unlikely to occur in the normal course of vehicle operation. Thus, the code is intended to be exclusively used by a maintenance person for stopping a vehicle indefinitely while, for example, the person is servicing the conveyance system.

A fourth bumper switch code is generated from three depression and release pairs on the back bumper within a short enough time interval to be unambiguous from any other code (e.g., 2 seconds) while the vehicle is stopped. This code is interpreted as an instruction for the vehicle to move backwards slowly a short distance or time interval (e.g., 5 seconds). As with the third bumper switch code, this code is also highly unlikely to occur in the normal course of vehicle operation. Thus, the code is also intended to be exclusively used by a maintenance person, for example, when backing up vehicles that have piled-up.

A fifth bumper switch code is generated from a single depression of the back bumper switch while the vehicle is moving backwards. This code is interpreted as a stop signal. While the code cannot be generated during normal operation (since a vehicle does not in normal operation move backwards), the code is intended to be generated when a vehicle moves backwards and contacts another object. Note that typically the other object is either another vehicle or a tap by a maintenance person instructing the vehicle to cease backward movement.

Further note that other bumper switch codes, or more generally obstruction detection codes, that are unlikely to be generated by manipulation of the obstruction detection device(s) in the normal course of automatic vehicle operation can also be defined. Thus, additional vehicle instructions and/or data can also be communicated for vehicle control via codes generated from input to the obstruction detection device(s). For example, instructions regarding vehicle acceleration, braking, speed control and monitoring for appropriate limits of motor current and motor temperature can be provided in this manner.

Other features and benefits of the present invention will become apparent from the detailed description and the accompanying figures contained hereinafter.

DETAILED DESCRIPTION

Figure 1:
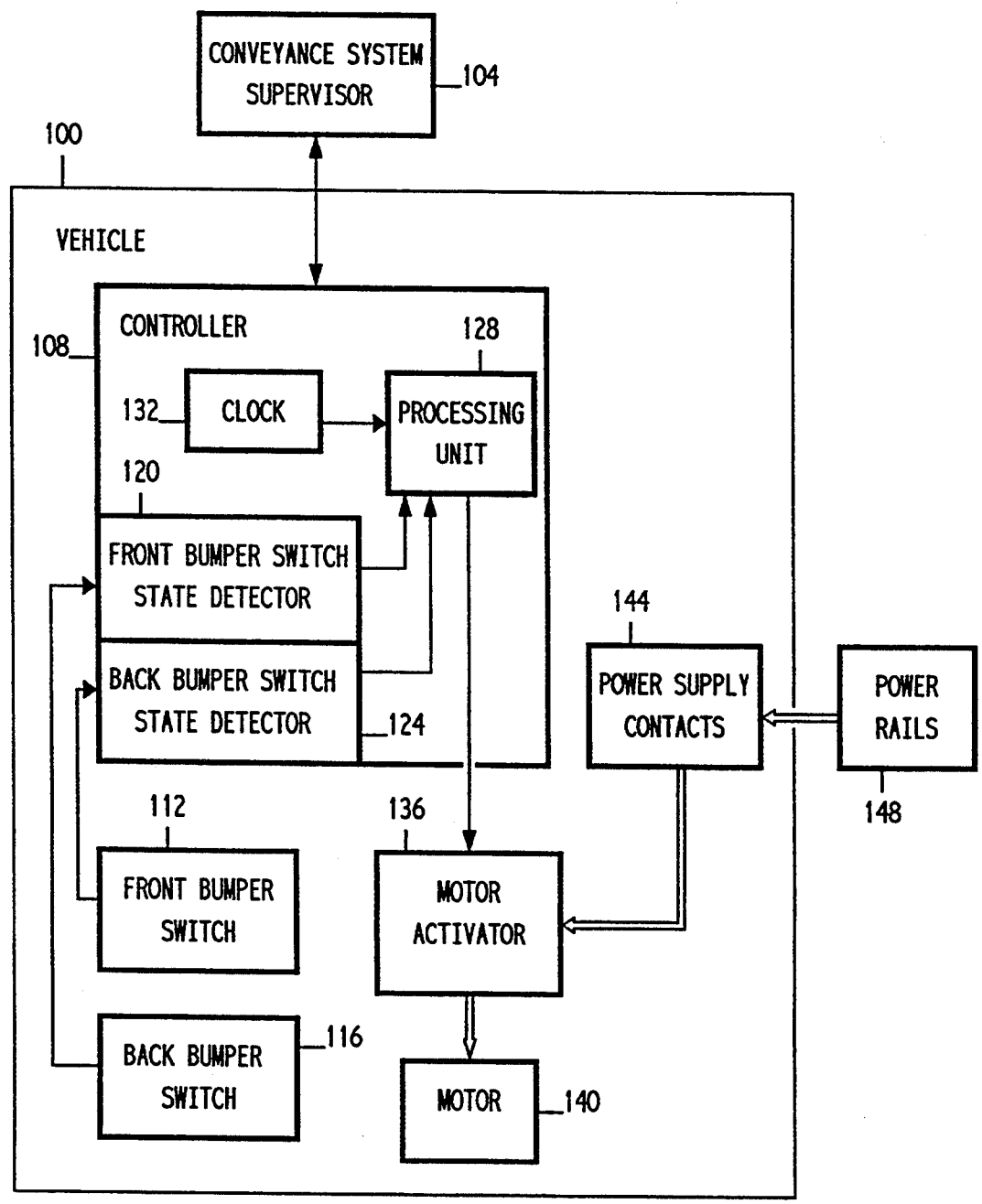
FIG. 1 is a block diagram illustrating components of the conveyance vehicle 100 together with the data signal and electrical power flows between these components.

Referring to FIG. 1, a high level block diagram is presented of the electrical components related to controlling an automated conveyance vehicle 100. The arrows between the blocks in the diagram represent the primary electrical power flows (the double lined arrows) and control or data flows (the thin lined arrows).

In the present embodiment, the vehicle 100 is substantially autonomous. The vehicle 100 traverses a predetermined network of paths or tracks (not shown) in arriving at an assigned destination. Note that in normal operation, substantially all vehicle 100 movements are in a predetermined "forward" direction which depends on the polarity of the electrical power supplied to the vehicle. Vehicle 100 path changes are accomplished by movable portions of the tracks (also not shown) controlled by various track controllers including, at the highest level, a conveyance system supervisor 104. In fact, the conveyance system supervisor 104 provides high level automated control for the entire conveyance system. Thus, the conveyance system supervisor 104 schedules use of the vehicle 100, determines the route to be used by the vehicle 100 and tracks the progress of the vehicle 100. In providing these functions, the conveyance system supervisor 104 exchanges information with the vehicle 100 intermittently. For example, commands are provided by the conveyance system supervisor 104 designating when the vehicle 100 is to commence forward movement and, at predetermined locations, the conveyance system supervisor 104 is supplied by vehicle 100 with its unique vehicle identifier whereby the location of vehicle 100 can be determined by the conveyance system supervisor 104. Within vehicle 100, a controller 108 is provided for controlling the behavior of the vehicle. Thus, the controller 108 provides the communication between vehicle 100 and the conveyance system supervisor 104. Furthermore, the controller 108 provides real time control of vehicle 100 movement including the direction of movement, speed and the length of time vehicle 100 is stopped. However, in order for the controller 108 to provide control, it receives input electrical signals from both a front bumper switch 112 which is attached as the forwardmost portion of vehicle 100, and a rear bumper switch 116 which is attached as the rearwardmost portion of vehicle 100. In the present embodiment, both the front bumper switch 112 and the rear bumper switch 116 are substantially the same, each being contact sensitive and being in one of two states: a contact state whereby the bumper switch registers a contact with an object, and a release state whereby the bumper switch registers no contact with an object. Each bumper switch supplies the controller 108 with signals indicating its current state. Thus, for example, whenever the forward bumper switch 112 initially registers contact with another vehicle or a maintenance person, the signal provided to the controller 108 is detectably changed. Similarly, when an initial release of physical contact occurs with the bumper switch, the signal provided to the controller 108 is also detectably changed.

To receive the signals generated by the bumper switches, the controller 108 contains two substantially identical bumper switch state detectors: a front bumper switch state detector 120 for detecting the state of the front bumper switch 112, and a rear bumper switch state detector 124 for detecting the state of the rear bumper switch 116. Each bumper switch state detector stores the current state of the bumper switch to which it is connected. Further, a processing unit 128 within the controller 108 polls each bumper switch state detector to determine when the bumper switch connected to the bumper switch state detector changes state.

The processing unit 128 provides real time control of the vehicle 100 via software stored and executed in the processing unit. The processing unit 128 also receives timing signals from a clock 132 also residing in the controller 108. Thus, the input received from the two bumper switch state detectors 120, 124 and the clock 132 allows the processing unit 128 to recognize predetermined bumper switch codes occurring within predetermined time intervals and subsequently allowing the processing unit 128 to output signals relating to the movement of the vehicle 100. In particular, the processing unit 128 provides such output signals to a motor actuator 136 for directing movement of the vehicle 100 by controlling the electrical power to the motor 140. More precisely, the processing unit 128 output provides the motor actuator 136 with instructions for (a) designating the direction, either forward or backward, the vehicle 100 is to move; and (b) specifying the speed of the vehicle 100 in the prescribed direction.

The motor actuator 136 receives electrical power from the power supply contacts 144 residing on vehicle 100. The power supply contacts 144 draw electrical power from electrified power rails 148 continuously provided along the predetermined conveyance vehicle tracks.

Figure 2A:
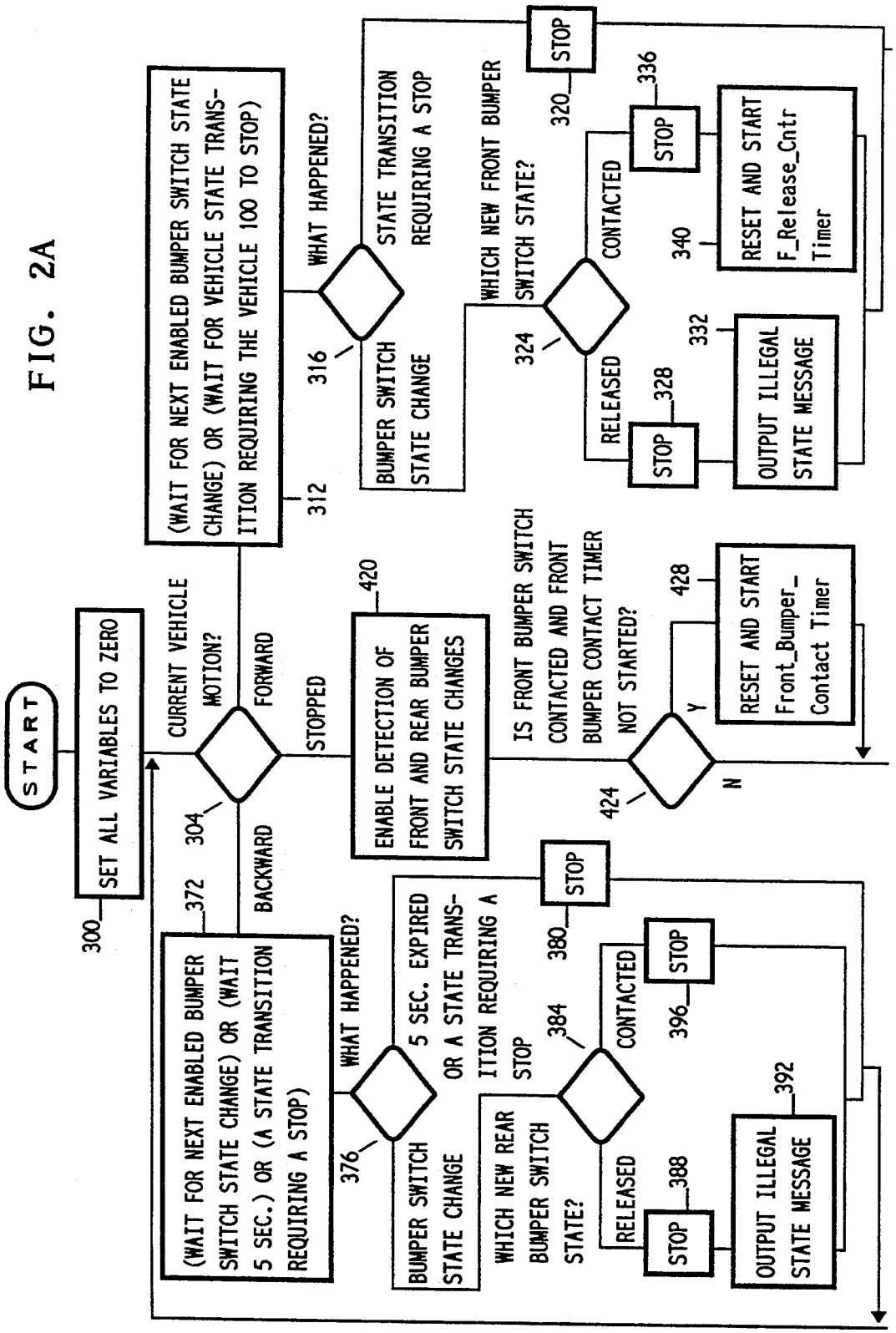
FIGS. 2A–D present a flowchart of the program used by the processing unit 128 in identifying a predetermined code input to a front or rear bumper switch.
Figure 2B:
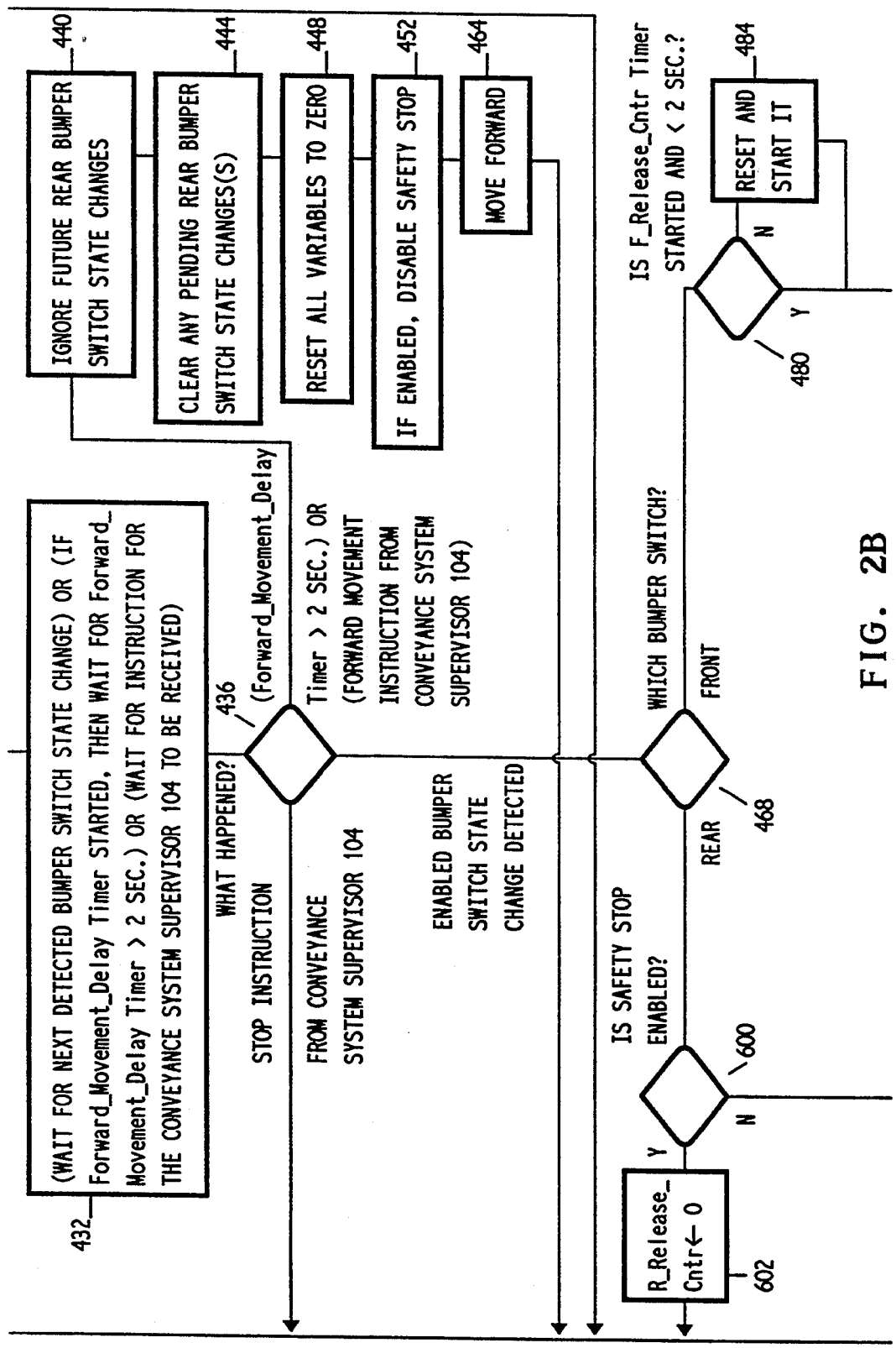
Figure 2C:
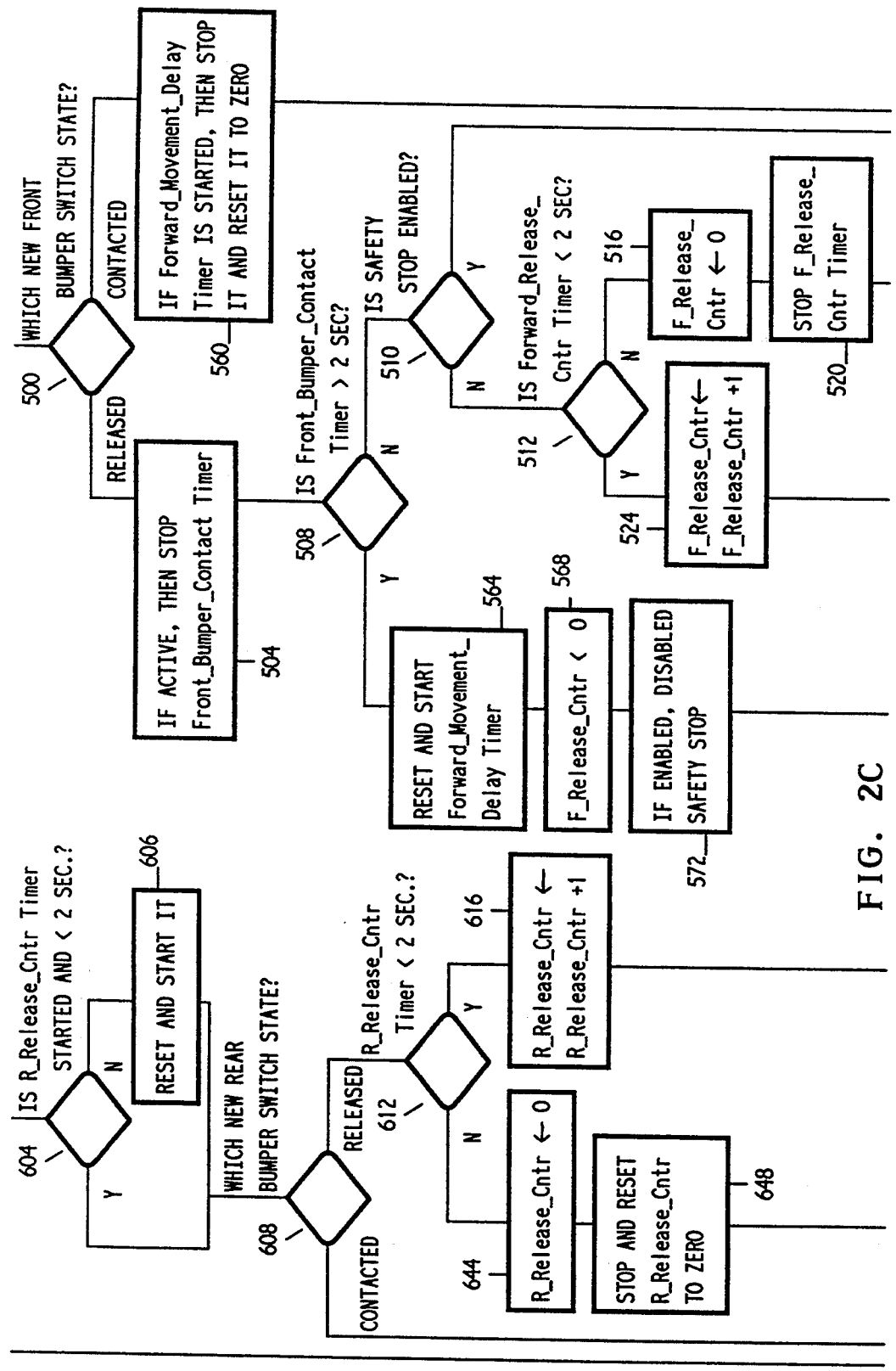
Figure 2D:
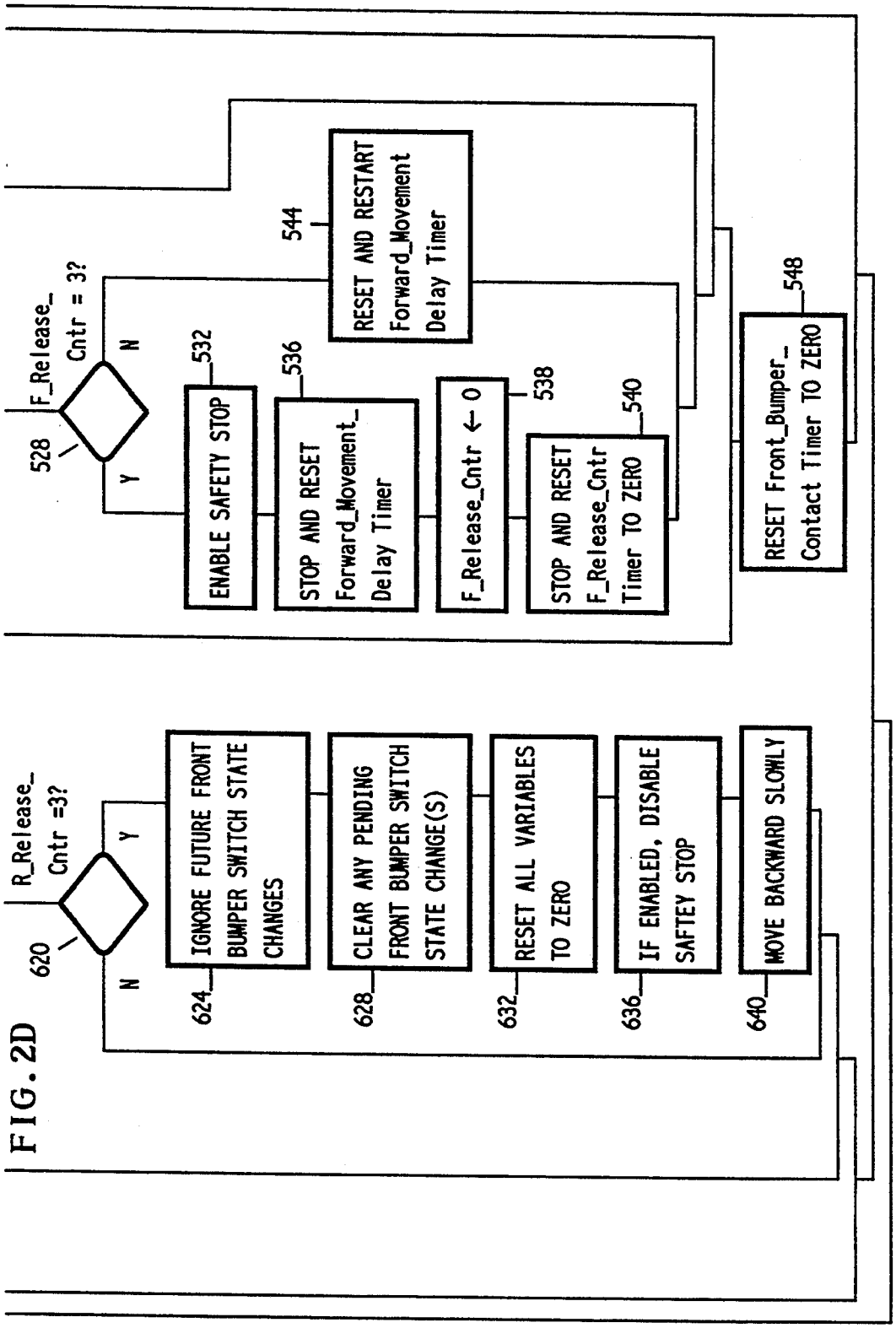

With reference to FIGS. 2a and 2b, a flowchart is presented giving the steps performed by the processor unit 28 when interpreting codes input to the vehicle 100 via the bumper switches 112 and 116, and subsequently issuing commands for controlling the movement of the vehicle 100. More precisely, the flowchart of FIGS. 2a and 2b represents the program executed by the processing unit 128 for recognizing and acting upon the following five codes:

1.1 A single hit (i.e., contact/release pair) on the front bumper switch 112 when the vehicle 100 is moving forward thereby designating a temporary stop of vehicle 100;

1.2 A sequence of three hits (i.e., contact/release pairs) on the front bumper switch 112 when the vehicle 100 is moving forwardly or stopped, thereby designating that the vehicle 100 should enter a safety stop state whereby the vehicle only responds to the code 1.3 below;

1.3 A continuous contact of the front bumper switch 112 for a predetermined time interval (e.g, two seconds) while the vehicle 100 is stopped (possibly in a safety stop state), thereby designating the vehicle should proceed forwardly after a predetermined time interval (e.g., two seconds);

1.4 A sequence of three hits (i.e., contact/release pairs) on the rear bumper switch 116 when the vehicle 100 is stopped, thereby designating that the vehicle should move backwards slowly for a predetermined time interval (e.g., five seconds);

1.5 A single contact of the rear bumper switch 116 when the vehicle 100 is moving backwards, thereby designating that the vehicle should stop.

In recognizing these five codes, the following six program variables are used in FIG. 2a and 2b:

2.1 FrontBumperContact Timer: This timer variable contains the amount of time (in seconds) the front bumper switch 112 is contacted;

2.2 ForwardMovementDelay Timer: This timer variable contains the amount of time elapsed from the end of a front bumper switch contact. This variable is used in determining when to continue vehicle 100 movement after a temporary stop;

2.3 FReleaseCntr: This integer variable stores the number of times the front bumper switch is released within a predetermined time interval (e.g., two seconds);

2.4 RReleaseCntr: This integer variable stores the number of times the rear bumper switch 116 is released within a predetermined time interval (e.g., two seconds);

2.5 FReleaseCntr Timer: This timer variable contains the time elapsed since the first front bumper switch release that can (potentially) be interpreted as part of a code to put vehicle 100 in the safety stop state;

2.6 RReleaseCntr Timer: This timer variable contains the elapsed time since the first rear bumper switch release that can (potentially) be interpreted as part of a code to signal vehicle 100 to move backwards.

Referring now to the steps in FIGS. 2a and 2b, in step 300, the six variables described immediately above are initialized to zero. Typically, this step is performed before the vehicle 100 is activated in order to proceed to a desired destination. However, if necessary, the step may be performed while the vehicle 100 is also in transit. In step 304, a determination is made as to whether the vehicle 100 is moving forward, backward or stopped. The steps 312 through 340, reached via the step 304 control branch labeled "forward," are performed when stopping the forward movement of vehicle 100. Thus, this branch is executed for codes that apply when the vehicle 100 is moving forwardly; i.e., codes 1.1 and 1.2. The steps 372 through 396, reached via the step 304 control branch labeled "backward," are performed in stopping the backwards movement of vehicle 100. Thus, this branch is executed when code 1.5 is input. Portions of the steps 420 through 640, i.e., the steps below the step 304 control branch labeled "stopped," are performed during the recognition of each of the codes 1.1 through 1.4 since at some time during the recognition process of each of these codes the vehicle 100 is stopped.

In further describing the flowchart of FIGS. 2a and 2b, the steps performed when each one of the codes 1.1 through 1.5 is input will be discussed.

With regard to code 1.1, the vehicle 100 must be moving forwardly. Thus, from step 304, step 312 is encountered. In step 312, the processing unit 128 enters a wait state whereby processing other than the steps in the flowchart of FIGS. 2a and 2b can be performed. The processing unit 128 remains at step 312 until an enabled (i.e., nonignored) bumper switch state change or transition is detected or until the vehicle 100 transitions to a state requiring the vehicle to stop. In the current embodiment, transitions requiring a stop occur when: (a) a conveyance system supervisor 104 stop instruction is received; (b) a temperature measurement for the motor 140 exceeds 80° C.; (c) an excessive current draw by motor 140 for at least two seconds occurs; or (d) a failure of a sensor for measuring motor 140 revolutions occurs. As will become clear from the analysis of the steps below step 304 on the stopped branch, only bumper switch state changes to the front bumper switch 112 are enabled for step 312. When one of the two wait terminating conditions of step 312 occurs, step 316 determines which one occurred. If a stop instruction occurred, then, in step 320, the vehicle 100 stops. Otherwise, in step 324, a determination is made as to whether the new front bumper state is a release or a contact. If a release is detected, then an error has occurred since the vehicle 100 was moving forwardly while having the front bumper switch 112 in contact with an object, a situation that violates the constraints by which vehicle 100 is to operate. Thus, in step 328, the vehicle 100 stops and, in step 332, an illegal state message is output to a display panel or an internal processing unit 128 error log or to the conveyance system supervisor 104. Alternatively, if a front bumper switch contact is detected, then, in step 336, the vehicle 100 stops and, in step 340, the FReleaseCntr Timer is reset to zero and restarted. That is, by starting this timer, the time interval for detecting multiple hits on the front bumper switch 112 as in code 1.3 has commenced.

Subsequently, regardless of the control path taken from step 316, the processing unit 128 loops back to step 304 and, since the vehicle 100 is now stopped, step 420 is encountered. In this step, since codes can be potentially entered from both of front and rear bumper switches, detection of input codes from both bumper switches is enabled. Subsequently, steps 424 and 428 assure that if the bumper switch 112 is in a prolonged contact with an object, then the FrontBumperContact Timer is measuring the length of time of the contact. Note, in the present case of a single hit on the front bumper switch 112 for code 1.1, this switch may or may not still be contacted. Regardless, in step 432, the program waits for any one of three events to occur. That is, the program waits for:

3.1 The next detected bumper state change (from either the front or the rear bumper switch). Note, as an aside, the bumper switch state detectors 120 and 124 work in cooperation with the processing unit 128 such that each bumper switch state change to be detected at a wait statement can be detected even if the state change occurs prior to the processing unit 128 encountering such a wait statement. (Of course, in such a case, no wait would occur for the processing unit 128.) Further, note that if there is more than one such bumper state change, then each such change is detected and processed in the order in which it is detected.

3.2 If the ForwardMovementDelay Timer is enabled, i.e. actively measuring the elapsed time since the release of a detected front bumper contact, then wait for a predetermined (e.g., two second) time interval to expire;

3.3 A forward instruction from the conveyance system supervisor 104.

Once one of the above terminating wait conditions of step 432 occurs, a determination is made in step 436 as to which of the conditions 3.1 through 3.3 occurred. Assuming in the present case (e.g., code 1.1) that 3.1 occurred due to the release of the front bumper switch 112 following its contact, the "enabled bumper switch state change detected" branch is followed and, therefore, step 468 is encountered to determine which bumper switch had its state changed. Since the front bumper switch was changed, in step 480, a determination is made as to whether the timer variable FReleaseCntr Timer has been started or, if it has been started, if its value is less than or equal to two seconds. That is, since the number of front bumper switch releases within a predetermined time (e.g., two seconds) must be retained, this timer variable must be started if it is not or reset to zero and restarted if it is currently greater than two seconds. However, in the present case, since this variable timer was already started in step 340 and presumably has a value of less than two seconds currently, step 484 is obviated and step 500 is next encountered. In step 500, a determination is made as to whether the front bumper switch 112 was contacted or released. Thus, step 504 is next encountered and, if the front bumper contact timer was started in step 428, then it is stopped here since the front bumper switch is no longer detectably contacted. Subsequently, in decision step 508, a determination is made as to whether the front bumper contact timer has a value greater than a predetermined value (e.g., two seconds). Thus, this decision step facilitates in differentiating between codes 1.1 and 1.3. In the present case, the negative branch from step 508 is taken. Subsequently, in step 510, a determination is made as to whether the safety stop state is enabled from a previous entering of code 1.2. Since this cannot occur in the present case, decision step 512 is next encountered. In this step, a determination is made as to whether the FReleaseCntr Timer variable is less than some predetermined time interval (e.g., two seconds). This decision step facilitates in determining if there has been multiple contacts with the front bumper switch 112 within a predetermined time interval as in code 1.3. Presumably, in the present case, the affirmative step is taken since this timer variable was started in step 340 and the contact/release pair of a single hit on the front bumper 112 is substantially shorter than two seconds. Thus, in step 524, the number of front bumper switch 112 releases, stored in FReleaseCntr is incremented. Subsequently, in step 528, a determination is made as to whether there have been three such releases as is required for code 1.3. Since the present case provides only one such release, the negative branch is taken and step 544 is performed, thereby resetting to zero and restarting the ForwardMovementDelay Timer such that the vehicle 100 can commence to move forward when this timer exceeds a value of two seconds. Following this, in step 548, the FrontBumperContact Timer, assured to be stopped due to step 504, is reset to zero.

Following step 548, the flow of control reverts back to step 304. At this point, it is worthwhile to summarize the current state of the program. The FrontBumperContact Timer is zero. The ForwardMovementDelay Timer is running. The FReleaseCntr variable has a value of 1. The RReleaseCntr has a value of zero. The FReleaseCntr Timer is running. The RReleaseCntr Timer is zero. The safety stop state is disabled and the vehicle 100 remains stopped. Thus, from step 304, steps 420 through 432 are again encountered in much the same manner as in the initial iteration. (Note that step 428 could also be performed on this iteration as well if the front bumper switch 112 were contacted again sufficiently quickly.) Assuming in step 432 that no further codes are input and the conveyance system supervisor 104 does not issue an instruction causing the vehicle 100 to move forward, the only possibility of exiting step 432 in a timely manner is for the ForwardMovementDelay Timer to achieve a value greater than two seconds. That is, the vehicle 100 remains temporarily stopped for approximately two seconds, most of this time being spent at step 432.

Assuming the step 432 completes due to the ForwardMovementDelay Timer becoming greater than or equal to two seconds, in step 436, a determination of this event is made and subsequently steps 440 through 464 are performed. Thus, in step 440, any future rear bumper switch 116 state changes which may occur are ignored. In step 444, any currently pending rear bumper switch 116 state changes which may be still queued for processing are cleared. In step 448, the six variables 2.1 through 2.6 are reset to zero. In step 452, if the safety stop state is enabled, then it is disabled here. Finally, in step 464, the processing unit 128 issues a forward movement instruction to the motor actuator 136 resulting in forward movement of the vehicle 100. Therefore, completing the processing relating to code 1.1.

With regard to code 1.2 and FIGS. 2a and 2b, the vehicle 100 is presumed either moving forwardly or stopped. In both contexts (i.e., moving forwardly or stopped), the processing is substantially similar, with the deviations being on the steps performed in processing the initial front bumper switch 112 contact of the three contact/release pairs that compose code 1.2. Thus, when the vehicle 100 is initially moving forwardly, the steps up to the second encounter of the decision step 424 for processing the first contact/release pair are performed in exactly the same manner as described for code 1.1 above.

Alternatively, if the vehicle 100 is initially stopped when the initial contact for code 1.2 is detected, then this contact is detected at wait step 432. In this case, steps 436, 468 and 480 are performed. Note that regarding step 480, the timer variable FReleaseCntr Timer may have been previously started due to a previous front bumper switch state change while vehicle 100 has remained stopped. However, assuming no other front bumper switch codes have been entered in a timely manner, if FReleaseCntr Timer is running, then its value is greater than two seconds. Thus, FReleaseCntr Timer is either stopped or greater than two seconds. Therefore, step 484 is performed causing FReleaseCntr Timer to be reset to zero and restarted. Subsequently, since a front bumper switch contact has been detected from step 500, step 560 is performed wherein, if running, the ForwardMovementDelay Timer variable is stopped and reset to zero (but not restarted). This is required since, if the ForwardMovementDelay Timer is running, the vehicle 100 is about to commence forward movement in the absence of any additional input. However, in the present case, a front bumper switch contact was detected thereby negating the pending forward movement of vehicle 100. Subsequently, steps 304 and 420 are performed in the same manner as in all previously described encounters.

When step 424 is encountered after either of the above two contexts for the processing of code 1.2, the remaining processing for the code is identical. Note that in both contexts, only the timer variable FReleaseCntr Timer is running, and FReleaseCntr is equal to 1. Each of the other six variables are presently zero. Further, note that since there are two additional contact/release pair state changes to be processed for code 1.2, the front bumper switch 112 can be contacted with the second front bumper switch hit during or after execution of step 424. Thus, step 428 may or may not be executed. Therefore, upon arriving at the wait step 432, the FrontBumperContact Timer may not be running. Regardless, assuming completion of wait step 432 is due to the next unprocessed contact with the front bumper switch 112, steps 436, 468 and 480 are performed. In step 480, note that FReleaseCntr Timer is currently running and has a value less than two seconds (since code 1.2 is required to be entered within two seconds). Thus, step 484 is not performed and processing continues with steps 500 and 560 with nothing occurring in step 560 since the variable ForwardMovementDelay Timer is not running.

Subsequently, processing again loops back to step 304 and steps 420, 424 and possibly 428 are performed. (Note, even though for code 1.2, a release is the next front bumper switch 112 state change to be processed, potentially, the release could have occurred and the succeeding contact could be occurring when step 424 is executing.) Consequently, the wait step 432 is again encountered, and assuming completion of this step is due to the next unprocessed release of the front bumper switch 112, the steps 436, 468, 480, 500 and 504 are performed. In step 504, note that if the FrontBumperContact Timer was started in step 428, it is stopped here, the stopping being required since the front bumper switch 112 is no longer being detectably contacted. Subsequently, in step 508, a determination is made as to whether the front bumper switch 112 was contacted longer than two seconds as is required for code 1.3. Since, in the present case, no front bumper switch 112 contact can last even one second, step 510 is next encountered. In this step, a determination is made as to whether the safety stop is currently enabled. Since the only result of code 1.2 is to cause vehicle 100 to enter the safety stop state, if the vehicle 100 is already in the safety stop state, then no further processing of the current front bumper switch release is required beyond resetting the FrontBumperContact Timer to zero (if not zero already). Thus, assuming the vehicle 100 is not currently in the safety stop state, step 512 is next encountered. In this step, a determination is made as to whether the predetermined time interval of two seconds for code 1.2 has elapsed since the initial contact of the front bumper switch 112 for this present input code. If the two second time interval were to elapse, then steps 516 and 520 would be performed thereby causing all previous front bumper switch releases to be discarded and the timer variable FReleaseCntr Timer to be stopped and reset to zero (but not restarted). Alternatively, assuming the predetermined two second time interval has not expired, step 524 is encountered and the number of front bumper switch releases, stored in FReleaseCntr, is incremented. (Note that the value of FReleaseCntr is now two, since this is the second release input for the present code.) Subsequently, step 528 is performed to determine if there has been three bumper switch 112 releases. Since only two have occurred, the negative branch from this step is taken thereby encountering step 548 to reset the FrontBumperContact timer and then loop back to step 304 for the next iteration.

The processing for the third contact/release pair is identical to the first and second pair with the exception that when step 528 is encountered during processing of the third release, the affirmative branch is taken and steps 532 through 540 and step 548 are performed. Thus, the vehicle 100 enters the safety stop state (step 532) and all variables relating to the front bumper switch 112 are reset to zero. Thus, any further non-prolonged hits on the front bumper switch are ignored since each release from such a hit is processed through the negative branch of step 510 and thereby ignored.

As an aside, note that during the elapsed time while the code 1.2 was being input, the rear bumper switch 116 can potentially also sustain contacts and releases. Since there is currently only a single code (i.e., code 1.4) that can be processed from the rear bumper switch 116 while the vehicle 100 is stopped and further, since this code is not to be recognizable in the safety stop state, any rear bumper switch 116 manipulation processing occurring substantially simultaneously or interleaved with the front bumper switch 112 manipulation processing is discarded upon any subsequent interaction with the rear bumper switch 116 (steps 600, 602).

In addition, note that preferably the vehicle 100 includes at least one of an indicator light and/or an audio indicator for indicating the state of the vehicle 100. Such features are particularly useful in regard to the safety stop state since such indicators allow a maintenance person to easily distinguish a malfunctioning vehicle 100 from a vehicle in the safety stop state.

With regard to code 1.3 which can only be processed while the vehicle is stopped, assume the processing unit 128 is at the wait step 432 when the front bumper switch 112 is contacted for a prolonged time (i.e., two seconds) as code 1.3 requires. Subsequently, steps 436, 468, 480, 484, 500 and 560 are performed, thereby restarting FReleaseCntr Timer (step 484), and assuring that the variable ForwardMovementDelay Timer is stopped and reset to zero. Subsequently, steps 304, 420 and 424 are performed. Note that since the front bumper switch 112 contact is prolonged, step 428 is performed thereby restarting the FrontBumperContact Timer. Following this, step 432 is encountered and, if no further rear bumper switch state changes or conveyance system supervisor 104 instructions are input, step 432 completes when the front bumper switch 112 is released. As an aside, note that rear bumper switch 116 state changes can also cause step 432 to complete. However, note that no flow of control sequence of steps succeeding step 432 resulting from a state change to the rear bumper switch 116 can change any of the variables relating to the front bumper switch 112 except for a sequence including step 632. Moreover, step 632 can only be performed if RReleaseCntr is equal to three in step 620. As will be discussed below, this can only occur if code 1.4 has been input via the rear bumper switch 116 which is, of course, not the code currently assumed for input.

Therefore, assuming step 432 completes only when the front bumper switch is released and that the contact has been sufficiently long such that the FrontBumperContact Timer exceeds two seconds, then steps 436, 468, 480, 484, 500 and 504 are performed. (Note that step 484 is performed since FReleaseCntr Timer is greater than two seconds in this case.) In step 504, the FrontBumperContact Timer is stopped. In step 508, it is determined that the FrontBumperContact Timer is greater than two seconds, thus, steps 564 through 572 are performed. That is, in step 564, the Forward Movement Delay Timer is restarted so that the vehicle 100 can commence moving forward when the wait step 432 completes due to this timer variable attaining a value of at least two seconds. In step 568, the count of how many previous front bumper switch releases is zeroed and, in step 572, the vehicle 100 is assured not to be in the safety stop state. Consequently, steps 548, 304, 420 and 424 are performed. Assuming the front bumper switch 112 remains released, step 428 is not performed, wait step 432 is entered and completes (barring any further input) when the Forward Movement Delay Timer exceeds two seconds. Subsequently, steps 436, 440, 444, 448, 452 and 464 are performed in the same manner as described with regard to code 1.1 above, thereby causing the vehicle 100 to move forward.

With regard to code 1.4, when the vehicle 100 is stopped (however, not in the safety stop state), three hits within a two second interval on the rear bumper switch 116 indicates that the vehicle 100 should back up slowly (e.g., at one-quarter normal forward speed). Each contact and release of the rear bumper switch 116 is detected in step 432. Following the first contact, the steps 436, 468, 600 and 604 are performed. Note that steps 604 and 606 have logic comparable to steps 480 and 484. Thus, assuming RReleaseCntr Timer is either not started or its current value is greater than two seconds, this timer variable is reset to zero and (re)started in step 606. Further note that since none of the steps 304, 420 through 436 and steps 468 through 572 manipulate either of the two rear bumper switch related variables, RReleaseCntr and RReleaseCntr Timer, any miscellaneous front bumper switch state changes will not affect the processing of rear bumper switch state changes. Also note that since the second and third rear bumper switch contacts for code 1.4 are within two seconds, step 606 is not performed again during the processing of this code. Thus, as a result of these notes and the observation that no further processing regarding the two rear bumper state related variables occurs during the additional contacts (as opposed to releases) for the code 1.4, the detected contacts of the rear bumper switch for this code can be ignored. Thus, only the rear bumper switch releases of the contact/release pairs need be described.

Therefore, concentrating exclusively now on the rear bumper switch release state changes of code 1.4, for each of the three such releases detected in wait step 432, steps 436, 468, 600, 604, 608 and 612 are performed. Since all three releases for code 1.4 must occur within the predetermined two seconds, the decision step 612 results in steps 616 and 620 being encountered next. Thus, the variable RReleaseCntr containing the number of releases within the two seconds is incremented on each execution such that in processing the third release, the value of RReleaseCntr is incremented to three. At this point, the affirmative branch of step 620 is taken and steps 624 through 636 are performed. That is, future front bumper state changes are ignored (step 624), any pending front bumper switch change(s) previously queued for processing are cleared so that the change(s) are not processed (step 628), all six process variables are reset to zero (step 632), the safety stop state is assured to be disabled (step 636), and finally, the motor actuator 136 is directed to cause the vehicle 100 to move backwards at a reduced speed.

As an aside, note that if the three hits on the rear bumper switch 116 do not occur within the predetermined two seconds, then in processing one of the releases associated with these hits, decision step 612 will cause the control branch having steps 644 and 648 to be performed. In this case, all retained information relating to the previous rear bumper switch 116 manipulations is discarded.

Lastly, consider code 1.5, wherein a single contact of the rear bumper switch 116 while the vehicle is moving backwards results in the vehicle stopping. Since the vehicle 100 is moving backwards, when step 304 is performed, the "backward" labeled control branch is followed to step 372. In step 372, the processing unit 128 waits for one of: (a) the next enabled bumper switch state change, (b) a vehicle 100 state transition requiring a stop (as in step 312), or (c) five seconds to expire (i.e., the vehicle only moves backwards a predetermined time duration). Note that since the vehicle 100 can only commence moving backwards after stopping and subsequently executing steps 624 through 640, the only bumper switch change states enabled are those that apply to the rear bumper switch 116. Thus, when the wait step 372 completes, step 376 determines whether a rear bumper switch state change or one of the other conditions of step 372 occurred. If a rear bumper state change was not detected, then in step 380, the processing unit 128 issues a stop instruction to motor actuator 136, thereby stopping the vehicle. Alternatively, assuming a rear bumper state change occurs, step 384 determines whether the state change is a release or a contact. In either case, the vehicle 100 is caused to stop. Thus, in particular, for the single contact of code 1.5, step 396 is performed. Alternatively, note that the "released" branch from step 384 should not be taken since this implies the vehicle 100 was moving backwards while in contact with an object which is an inappropriate movement for vehicle 100.

Thus, the above description of the five codes 1.1 through 1.5 illustrates how the flowchart of FIGS. 2a and 2b integrates these codes into a consistent unambiguous set of bumper switch input commands for vehicle 100 such that the vehicle can be caused to move forward, to stop or to move backward.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or other embodiments, and with the various modifications required by their particular application or uses of the invention. It is intended that the appended claims be construed to include alternative embodiments to the extent permitted by the prior art.

What is claimed is:

1. A method for controlling a vehicle of a conveying system comprising:
    identifying a first code when said first code is input to an obstruction detection means attached to said vehicle, said first code being required to be input within a predetermined time interval;
    relating said first code to a predetermined vehicle behavior;
    performing said predetermined vehicle behavior related to said first code.

2. A method as claimed in claim 1, wherein said obstruction detection means includes at least one of a front obstruction detector and a rear obstruction detector.

3. A method as claimed in claim 2, wherein at least one of said front obstruction detector and said rear obstruction detector is a bumper switch.

4. A method as claimed in claim 1, wherein said obstruction detection means is contact sensitive.

5. A method as claimed in claim 1, wherein said step of identifying includes manually actuating said obstruction detection means for inputting said first code.

6. A method as claimed in claim 1, wherein said step of relating includes determining a movement of said vehicle.

7. A method as claimed in claim 1, wherein said first code includes a predetermined sequence of transitions of said obstruction detection means, each said transition being one of: (a) said obstruction detection means changing from detecting an obstruction to not detecting an obstruction, and (b) said obstruction detection means changing from not detecting an obstruction to detecting an obstruction.

8. A method as claimed in claim 7, wherein said step of identifying includes detecting said predetermined sequence of transitions of said obstruction detection means, resulting from inputting said first code.

9. A method as claimed in claim 7, wherein said step of relating includes identifying said predetermined sequence of transitions of said obstruction detection means.

10. A method as claimed in claim 1, wherein said step of identifying includes one of receiving said first code from a front portion of said obstruction detection means when said vehicle is moving substantially forward, and receiving said first code from a rear portion of said obstruction detection means when said vehicle is moving substantially backward.

11. A method as claimed in claim 1, wherein said step of performing includes one of:
    a first step of configuring a controller for the vehicle so that the vehicle ceases to respond to at least a second code;
    a second step of configuring said controller so that the vehicle moves backwards.

12. A method, as claimed in claim 11, wherein said first step includes providing at least one of a visual indication and an audio indication that the vehicle ignores said second code.

13. A method as claimed in claim 11, wherein said second code is a backup code.

14. A method as claimed in claim 11, wherein said second configuring step is performed when said vehicle is stopped and said second code is input using a rear portion of said obstruction detection means.

15. A method as claimed in claim 1, wherein said first code is identified from among a plurality of codes and said plurality of codes further includes at least a second code having no predetermined time interval.

16. A method as claimed in claim 1, wherein said step of performing includes configuring a controller for the vehicle so that one or more of the following vehicle behaviors is provided:
    (a) the vehicle ceases to respond to at least a second code;
    (b) the vehicle stops forward movement;
    (c) the vehicle starts forward movement;
    (d) the vehicle starts backward movement;
    (e) the vehicle stops backward movement.

17. A method as claimed in claim 15, wherein each code of said plurality of codes includes a predetermined sequence of obstruction detection means transitions.

18. A method as claimed in claim 17, wherein said plurality of codes includes at least one code whose predetermined sequence includes a predetermined time interval between two consecutive transitions.

19. A method, as claimed in claim 1, wherein: said step of identifying includes monitoring elapsed time after said code is input.

20. A method, as claimed in claim 19, wherein said relating step is dependent upon the amount of time that is monitored.

21. A method, as claimed in claim 1, wherein said step of identifying includes counting changes that occur to said obstruction detection means when said code is input to said obstruction detection means.

22. A method, as claimed in claim 21, wherein the number of changes that are counted is greater than one.

23. An apparatus for controlling a vehicle of a conveying system comprising:
    obstruction detection means, attached to the vehicle, for use in inputting a code related to a predetermined vehicle behavior, said code having a predetermined sequence of transitions of said obstruction detection means, said predetermined sequence depending upon a predetermined time interval;
    decoding means for identifying said predetermined vehicle behavior related to said code, said decoding means using signals, relating to said code, output by said obstruction detection means;
    drive means, responsive to output from said decoding means, for performing the predetermined vehicle behavior related to said code.

24. An apparatus as claimed in claim 23, wherein each transition of said predetermined sequence includes transitioning said obstruction detection means from one of:
    (a) detecting an obstruction to not detecting an obstruction, and
    (b) not detecting an obstruction to detecting an obstruction.

25. An apparatus as claimed in claim 23, wherein said code is input substantially manually.

26. An apparatus as claimed in claim 23, wherein said predetermined time interval is shorter than any time interval for inputting said predetermined sequence accidently.

27. An apparatus as claimed in claim 23, wherein said obstruction detection means is contact sensitive.

28. An apparatus as claimed in claim 23, wherein said code is part of a plurality of codes and said code is used for configuring said decoding means so that one of a following vehicle behavior is provided:

the vehicle ceases to correspond to at least a first predetermined code of said plurality of codes;

the vehicle moves in a direction different from a forward direction.

29. An apparatus as claimed in claim 23, wherein said decoding means includes transition detection means for detecting the transitions of said obstruction detection means.

30. An apparatus as claimed in claim 23, wherein said decoding means includes timer means for timing said predetermined time interval.

* * * * *